(12) United States Patent
Nishida et al.

(10) Patent No.: US 7,433,208 B2
(45) Date of Patent: Oct. 7, 2008

(54) SWITCHING POWER SUPPLY DEVICE AND ELECTRONIC APPARATUS

(75) Inventors: Akio Nishida, Kyoto (JP); Fumi Kitao, Toyonaka (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 320 days.

(21) Appl. No.: 10/564,025

(22) PCT Filed: Apr. 20, 2005

(86) PCT No.: PCT/JP2005/007496

§ 371 (c)(1),
(2), (4) Date: Jan. 9, 2006

(87) PCT Pub. No.: WO2006/006289

PCT Pub. Date: Jan. 19, 2006

(65) Prior Publication Data

US 2008/0049472 A1  Feb. 28, 2008

(30) Foreign Application Priority Data

Jul. 7, 2004 (JP) .............................. 2004-201066

(51) Int. Cl.
*H02M 3/335* (2006.01)
(52) U.S. Cl. .................... 363/19; 363/21.07; 363/21.15
(58) Field of Classification Search .................... 363/18, 363/19, 97, 21.07, 21.15
See application file for complete search history.

(56) References Cited

U.S. PATENT DOCUMENTS 6,208,530 B1   3/2001   Hosotani
6,529,392 B2 *  3/2003   Nishida et al. ........... 363/21.16
6,577,511 B2 *  6/2003   Yamaguchi et al. ...... 363/21.07
6,816,392 B2 * 11/2004   Takamatsu ............... 363/21.15
2002/0136031 A1 9/2002  Yamaguchi et al.

(Continued)

FOREIGN PATENT DOCUMENTS

GB      2 377 096 A      12/2002

(Continued)

OTHER PUBLICATIONS

International Search Report for PCT Application No. PCT/JP2005/007496; International filing date, Apr. 20, 2005; mailed Aug. 9, 2005.

(Continued)

*Primary Examiner*—Jessica Han
*Assistant Examiner*—Emily Pham
(74) *Attorney, Agent, or Firm*—Keating & Bennett, LLP (57) ABSTRACT

A switching power supply device includes a primary winding of a transformer that is connected in series to a first switching element, and a secondary winding is provided with a rectifier circuit and an output voltage control circuit arranged to detect an output voltage and feed it back to a control circuit. The control circuit is provided with an on-period control circuit arranged to turn off the first switching element in an on-state based on a feedback signal from the output voltage control circuit and an off-period control circuit arranged to control an off-period thereof by delaying turn-on of the first switching element based on the feedback signal.

8 Claims, 7 Drawing Sheets

U.S. PATENT DOCUMENTS

2002/0186572 A1 12/2002 Nishida et al.
2004/0037093 A1 2/2004 Nishida et al.

FOREIGN PATENT DOCUMENTS

| GB | 2 377 770 A | 1/2003 |
| GB | 2 393 801 A | 4/2004 |
| JP | 07-067335 | 3/1995 |
| JP | 11-313483 | 11/1999 |
| JP | 2002-359974 | 12/2002 |
| JP | 2002-369517 | 12/2002 |
| JP | 2004-80941 | 3/2004 |

OTHER PUBLICATIONS

Official Communication issued in corresponding GB Patent Application No. GB0601032.6, dated Aug. 31, 2006.

Official communication issued in counterpart Chinese Application No. 200580000536.2, mailed on Mar. 7, 2008.

* cited by examiner

SWITCHING POWER SUPPLY DEVICE AND ELECTRONIC APPARATUS

BACKGROUND OF THE INVENTION

1. Field of the Invention

The present invention relates to a switching power supply device and an electronic apparatus including the same.

2. Description of the Related Art

In recent years, the demand for minimizing power consumption during standby when a printing operation is not performed in a printer or a facsimile machine, for example, has been increasing. Accordingly, a switching power supply device used for a power supply circuit unit of a printer or a facsimile has been required to reduce power consumption in a standby status.

Typically, a switching power supply device of an RCC (rising choke converter) type is used for a power supply circuit unit of those electronic apparatuses. However, the switching power supply device of the RCC type has a characteristic that a switching frequency increases as a load becomes lighter and the switching loss increases accordingly. Under these circumstances, reduction of the power consumption under a light load, such as in a standby state, cannot be expected.

Japanese Unexamined Patent Application Publication No. 7-7335 discloses an example of a switching power supply device of the RCC type that is capable of reducing power consumption under a light load. This switching power supply device includes a circuit to force a control terminal of a first switching element to be grounded for a predetermined time period under the light load, so as to delay turn-on of the first switching element and to prevent the switching frequency from exceeding a predetermined value.

However, in the switching power supply device in which the upper limit of the switching frequency is set by the above-described circuit, a sufficient effect of significantly reducing power consumption by decreasing the switching frequency under a light load cannot be obtained.

On the other hand, a switching power supply device for overcoming the above-described problem is disclosed in Japanese Unexamined Patent Application Publication No. 2004-80941. The switching power supply device according to this document includes a circuit for setting a minimum on-period in an on-period of a first switching element so that the minimum on-period is ensured. In this case, the on-period cannot be shortened and thus power is excessively supplied to a load in a standby status, so that an output voltage starts to rise. By providing a circuit for controlling (extending) an off-period upon detecting a slight increase in the output voltage, an increase in the output voltage is prevented and an increase in the switching frequency is minimized.

In the switching power supply device according to Japanese Unexamined Patent Application Publication No. 2004-80941, a standby status is detected by detecting that the output voltage has increased. Thus, a difference is caused between a standby output voltage and a rated output voltage. In other words, a variation width of the output voltage is disadvantageously large. Further, two systems of feedback circuits are required: a feedback circuit for controlling an on-period under a non-light load and a feedback circuit for controlling an off-period under a light load. Therefore, a gain changes at switching between those systems and also the output voltage changes at switching between the control systems when the load changes.

SUMMARY OF THE INVENTION

In order to overcome the problems described above, preferred embodiments of the present invention provide a single system feedback circuit without using a method of detecting an increase in output voltage and provide a switching power supply device in which a variation of the output voltage is minimized, and an electronic apparatus including the same.

A preferred embodiment of the present invention provides a switching power supply device including a transformer including a primary winding, a secondary winding, and a feedback winding; a first switching element connected in series to the primary winding; a control circuit provided between a control terminal of the first switching element and the feedback winding; a rectifier circuit connected to the secondary winding; and an output voltage control circuit detecting an output voltage output from the rectifier circuit and feeding back the output voltage to the control circuit through a single system.

The control circuit includes an on-period control circuit for turning off the first switching element in an on-state based on a feedback signal transmitted from the output voltage control circuit through a single system under a non-light load, and an off-period control circuit for controlling an off-period of the first switching element by delaying turn-on of the first switching element based on the feedback signal under a light load.

In another preferred embodiment, the switching power supply device further includes an impedance circuit arranged to connect the off-period control circuit to the on-period control circuit, the impedance thereof changing based on the feedback signal. Control of the off-period control circuit under a light load and control of the on-period control circuit under a non-light load are sequentially performed in accordance with the change in the impedance of the impedance circuit.

In another preferred embodiment, the off-period control circuit includes a third switching element provided between the control terminal of the first switching element and the feedback winding and a fourth switching element provided between a control terminal of the third switching element and a ground. The on-period control circuit includes a second switching element provided between the control terminal of the first switching element and the ground and a time constant circuit including a capacitor arranged to apply a control voltage to the second switching element. The impedance circuit includes a first path for feeding a current generated by the feedback signal to the capacitor and a second path serving as a bypass for feeding the current to the ground.

In another preferred embodiment, a minimum on-period is set in the on-period controlled by the on-period control circuit. Accordingly, the minimum on-period is ensured in every input/output condition, so that intermittent oscillation is prevented.

In another preferred embodiment, the impedance circuit is provided with a clamp circuit arranged to control a voltage of the capacitor C3 in the on-period control circuit for determining the control voltage of the second switching element at a predetermined value when the first switching element is in an off-state.

In another preferred embodiment, the second path is a bypass circuit arranged to feed the current generated by the feedback signal only when the first switching element is in an off-state.

In another preferred embodiment, the off-period control circuit includes a limit circuit arranged to set an upper limit of a voltage applied to the control terminal of the first switching element.

An electronic apparatus according to a preferred embodiment of the present invention includes the switching power supply device of any of the above-described preferred embodiments in a power supply circuit unit.

The on-period control circuit turns off the first switching element based on the feedback signal from the output voltage control circuit under a light load, and the off-period control circuit controls an off-period of the first switching element by delaying the turn on of the first switching element based on the feedback signal from the output voltage control circuit under a non-light load. Accordingly, both the on-period and off-period of the first switching element can be controlled by a feedback circuit of a single system. With this configuration, the output voltage does not vary at switching of the control systems when the load changes. Further, since an increase in the output voltage in a standby status need not be detected, no difference occurs between the output voltage in a standby status and the output voltage in a rated status, so that a variation width of the output voltage does not become large.

The impedance of the impedance circuit connecting the off-period control circuit and the on-period control circuit changes based on the feedback signal from the output voltage control circuit, and based on the change, control of the off-period control circuit under a light load and control of the on-period control circuit under a non-light load are sequentially performed. Accordingly, an increase in ripple or a variation in the output voltage does not occur at the switching between on-period control and off-period control.

The impedance circuit includes the first path for feeding a current generated by the feedback signal to the capacitor of the on-period control circuit and the second path that extends to the ground while bypassing the on-period control circuit. With this configuration, by changing the rate of the current to be fed to the ground through the bypass, an on-period under a light load can be set. Accordingly, a relationship between a power supplied to the load and the switching frequency (frequency characteristic) can be set.

By setting the minimum on-period in the on-period controlled by the on-period control circuit, the minimum on-period can be ensured in every input/output condition, so that intermittent oscillation can be prevented even under no load.

When the first switching element is in an off-state, the clamp circuit controls the voltage of the capacitor determining the control voltage of the second switching element at a constant voltage and extends the off-period without limit. Accordingly, an increase in the output voltage under no load can be prevented.

When the first switching element is in an off-state, the bypass circuit allows the current generated by the feedback to detour so that the charging amount in an on-period and the charging amount in an off-period of the capacitor can be independently changed. Accordingly, the degree of freedom of setting the relationship between power supplied to the load and the switching frequency (frequency characteristic) can be further increased.

The limit circuit sets the upper limit of the voltage applied to the control terminal of the first switching element, which enables a wide input voltage range.

According to various preferred embodiments of the present invention, a constantly stable operation can be realized because the power supply voltage to the load varies only slightly regardless of the status of the load.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A switching power supply device according to a first preferred embodiment is described with reference to FIGS. 1, 2A, and 2B.

Figure 1:
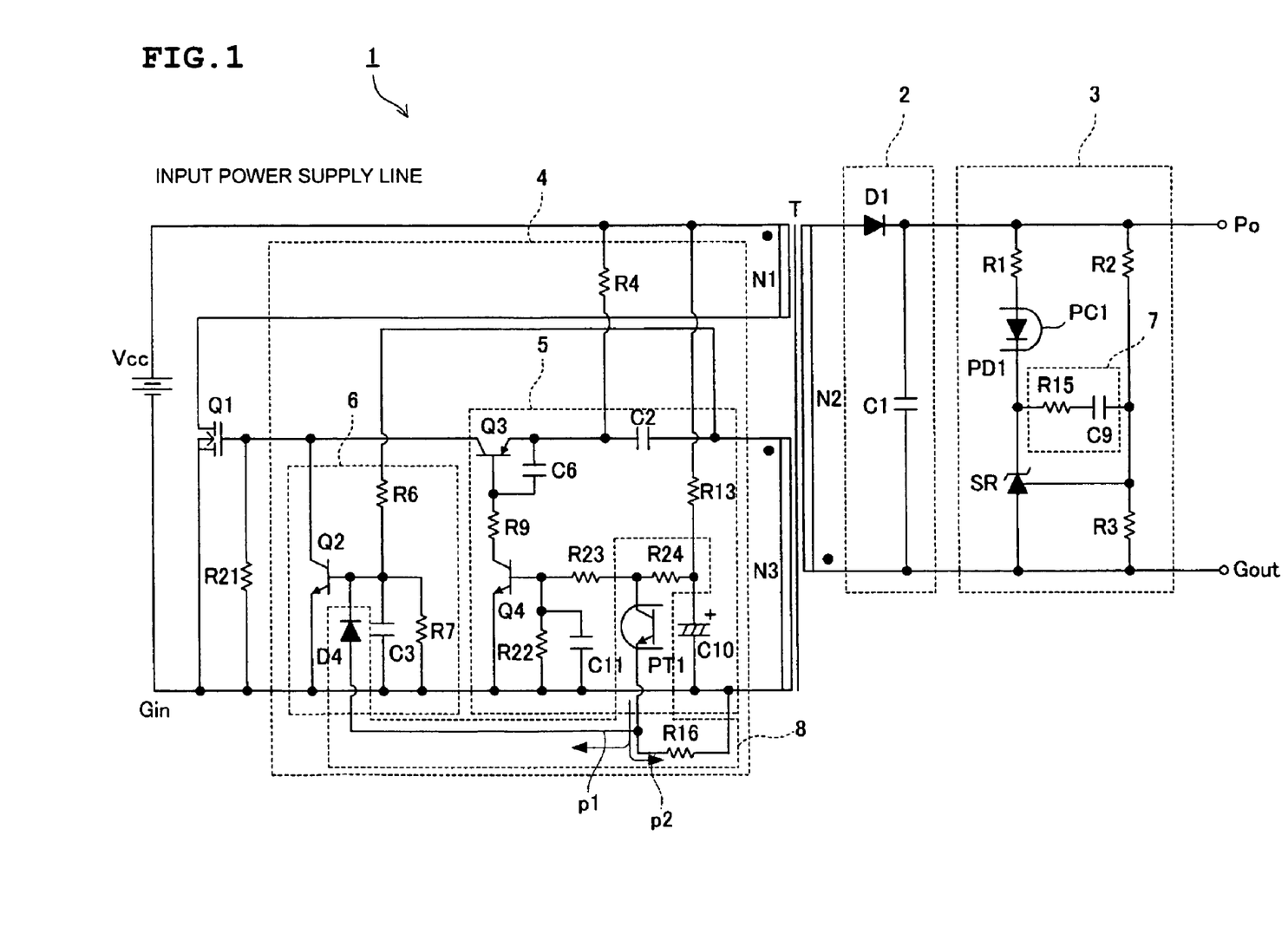
FIG. 1 is a circuit diagram of a switching power supply device according to a first preferred embodiment of the present invention.

FIG. 1 is a circuit diagram of the switching power supply device 1. This switching power supply device preferably includes a transformer T including a primary winding N1, a secondary winding N2, and a feedback winding N3; a first switching element Q1 connected in series to the primary winding N1; a control circuit 4 provided between a control terminal of the first switching element Q1 and the feedback winding N3; a rectifier circuit 2 connected to the secondary winding N2; and an output voltage control circuit 3 arranged to detect an output voltage output from the rectifier circuit 2 and feeding it back to the control circuit 4. The first switching element Q1 includes a MOSFET and applies a DC power Vcc as an input power to a series circuit defined by the first switching element Q1 and the primary winding N1.

The rectifier circuit 2 includes a diode D1 connected in series to the secondary winding N2 and a smoothing capacitor C1 connected between a cathode of the diode D1 and a ground. A secondary-side circuit including the secondary winding N2, the diode D1, and the capacitor C1 and a primary-side circuit in which the first switching element Q1 is arranged in series define a main circuit.

The output voltage control circuit 3 includes a voltage dividing circuit defined by resistors R2 and R3 between an output terminal Po and a ground Gout and also includes a series circuit defined by a resistor R1, a photodiode PD1 of a photocoupler PC1, and a shunt regulator SR. Further, the output voltage control circuit 3 includes a negative feedback circuit 7 defined by a series circuit including a resistor R15 and a capacitor C9 between a node of the resistors R2 and R3 and a cathode terminal of the shunt regulator SR. Additionally, the node of the resistors R2 and R3 is connected to a reference terminal of the shunt regulator SR.

The control circuit 4 includes an off-period control circuit 5 and an on-period control circuit 6. A third switching element Q3 and a capacitor C2 of the off-period control circuit 5 are provided in series between one end of the negative feedback winding N3 and a gate of the first switching element Q1.

A series circuit including a resistor R13 and a capacitor C10 of the off-period control circuit 5 defines a time constant circuit. A series circuit defined by a resistor R9 and a fourth switching element Q4 is connected between a base of the third switching element Q3 and an input power supply side ground Gin. Resistors R23 and R24 are connected between a base of the fourth switching element Q4 and the capacitor C10. A resistor R22 and a capacitor C11 are provided between the base of the fourth switching element Q4 and the input power supply side ground Gin. A capacitor C6 for preventing a malfunction caused by noise is provided between the base and an emitter of the third switching element Q3. A resistor R4 for startup is connected between a terminal on the first switching element Q1 side of the capacitor C2 and an input power supply line.

A series circuit defined by a phototransistor PT1 of the photocoupler PC1 and a resistor R16 is provided between a node of the resistors R23 and R24 and the input power supply side ground Gin.

A second switching element Q2 is provided between the gate of the first switching element Q1 and the input power supply side ground Gin in the on-period control circuit 6. A time constant circuit defined by the resistors R6 and R7 and the capacitor C3 is provided across the feedback winding N3. One terminal of the capacitor C3 is connected to the base of the second switching element Q2 so that the voltage of the capacitor C3 is applied between the base and the emitter of the second switching element Q2.

A diode D4 is connected between a node of the phototransistor PT1 and the resistor R16 and the base of the second switching element Q2. A gate protecting resistor R21 is connected between the gate and source (Gin) of the first switching element Q1.

The phototransistor PT1, the resistors R16 and R24, and the diode D4 define an impedance circuit 8. The impedance of the phototransistor PT1 is changed by a feedback signal transmitted through the photodiode PD1.

A first unique feature of the switching power supply device shown in FIG. 1 is that the circuitry is configured so as to feed a current of the phototransistor PT1 through the diode 4 to the capacitor C3 (for charging) and also to feed the current through the resistor R16 to the input power supply side ground Gin (through a bypass).

A second unique feature is that the circuitry is configured so as to control an on-timing of the fourth switching element Q4 by using the impedance circuit 8 and a time constant circuit defined by the resistors R22 and R23 and the capacitor C11.

An operation of the switching power supply device shown in FIG. 1 is as follows.

<1.1> Under light load

An off-period of the first switching element Q1 is controlled to keep an output voltage constant under light load, as described below.

<1.1.1> Off-period of the first switching element Q1

(Operation of the main circuit)

In an off-period of the first switching element Q1, an exciting energy of the transformer T (the energy accumulated during an on-period of the first switching element Q1) is output to the secondary side. In a conventional RCC, when an exciting current (herein, a current flowing through the secondary winding N2) becomes 0 (zero), a resonance voltage is generated in the feedback winding N3 and the first switching element Q1 is turned on and shifts to an on-period. In the circuit shown in FIG. 1, however, the first switching element Q1 cannot be turned on until the third switching element Q3 is turned on. Therefore, turn-on of the third switching element Q3 is a necessary condition to end an off-period of the first switching element Q1 under a light load. By turning on the third switching element Q3, the first switching element Q1 is turned on by a charge accumulated in the capacitor C2 and shifts to an on-period.

(Operation of the control circuit)

The impedance of the phototransistor PT1 determines a time period until the fourth switching element Q4 is turned on. That is, since a large current flows through the photodiode PD1 of the photocoupler PC1 under a light load, the impedance of the phototransistor PT1 decreases and a voltage of a collector terminal of the phototransistor PT1 also decreases. Since the base-emitter voltage of the fourth switching element Q4 (the voltage of the capacitor C11) depends on the time constant circuit defined by the resistors R22 and R23 and the capacitor C11, the time period until the fourth switching element Q4 is turned on depends on the voltage of the collector terminal of the phototransistor PT1. Therefore, an off-period of the first switching element Q1 becomes longer as the collector voltage of the phototransistor PT1 is lower under a light load. This is an operation of a current discontinuous mode.

<1.1.2> On-period of the first switching element Q1

(Operation of the main circuit)

After the first switching element Q1 is turned on, a current flows through a path: Vcc→the primary winding N1 of the transformer T→Q1→Gin, so that energy is accumulated in the transformer T. When the second switching element Q2 is turned on, the first switching element Q1 is turned off and shifts to an off-period.

(Operation of the control circuit)

During an on-period of the first switching element Q1, the capacitor C3 is charged by a voltage generated in the feedback winding N3. At this time, the voltage of the feedback winding N3 causes a current to flow to the time constant circuit defined by the resistors R6 and R7 and the capacitor C3, so that the charging voltage of the capacitor C3 rises. Further, a voltage of the capacitor C10 causes a current to flow to a parallel circuit defined by the capacitor C3 and the resistor R7 through a first path p1 including the phototransistor PT1 and the diode D4, so that the charging voltage of the capacitor C3 rises.

When the voltage of the capacitor C3 reaches an on-voltage Vbe(on) of the second switching element Q2, the second switching element Q2 is turned on and an off-period of the first switching element Q1 starts.

Under a light load, the voltage of the capacitor C3 at the time when the first switching element Q1 is turned on is relatively high. This is because the impedance of the phototransistor PT1 is low and a large amount of charge is accumulated in the capacitor C3 during an off-period of the first switching element Q1. Therefore, the voltage of the capacitor C3 reaches Vbe(on) of the second switching element Q2 in a short on-period of the first switching element Q1. Then, turn-on of the second switching element Q2 causes turn-off of the first switching element Q1.

<1.2> Under heavy load

Under a heavy load or a non-light load, the output voltage is kept constant by controlling an on-period of the first switching element Q1 as in a conventional RCC, as described below.

<1.2.1> Off-period of the first switching element Q1

(Operation of the main circuit)

In an off-period of the first switching element Q1, the exciting energy of the transformer T is output to the secondary side. When the exciting current of the transformer T becomes 0 (zero), a resonance voltage is generated in the feedback winding N3. At this time, the third switching element Q3 is in an on-state, and thus the first switching element Q1 is turned on by the resonance voltage and shifts to an on-period.

(Operation of the control circuit)

Under a heavy load, since a current of the photodiode PD1 of the photocoupler PC1 is small, the impedance of the phototransistor PT1 is high and the collector voltage of the phototransistor PT1 is also high. Accordingly, a charging time of the capacitor C11 is short and a turn-on timing of the fourth switching element Q4 comes early. For this reason, the time constant is set so that the fourth switching element Q4 is already turned on when the exciting current of the transformer T reaches 0 (zero) under a heavy load. Thus, the third switching element Q3 is in an on-state, and the first switching element Q1 is turned on immediately after a resonance voltage is generated in the feedback winding N3. This is an operation of a current critical mode, like a conventional RCC.

Since the impedance of the phototransistor PT1 is high, a small current flows from the capacitor C10 through a path: PT1→D4→(C3+R7), so that a small amount of charge is accumulated in the capacitor C3. Further, since the capacitor C3 is negatively charged due to the voltage of the feedback winding N3, the first switching element Q1 shifts to an on-period such that the capacitor C3 is in a negative potential.

<1.2.2> On-period of the first switching element Q1

(Operation of the main circuit)

After the first switching element Q1 is turned on, a current flows through a path: Vcc→N1→Q1→Gin, so that energy is accumulated in the transformer T. Turn-on of the second switching element Q2 causes turn-off of the first switching element Q1. That is, the first switching element Q1 shifts to an off-period.

(Operation of the control circuit)

During an on-period of the first switching element Q1, a current flows to a parallel circuit defined by the capacitor C3 and the resistor R7 through the resistor R6 by a voltage generated in the feedback winding N3. Also, a voltage of the capacitor C10 causes a current to flow through a path: PT1→D4→(C3+R7), so that the capacitor C3 becomes charged. At first, the capacitor C3 is in a negative potential. However, when the potential of the capacitor C3 reaches the on-voltage Vbe(on) of the second switching element Q2 by the charge, the first switching element Q1 is turned off and shifts to an off-period. In other words, the impedance of the phototransistor PT1 causes a change in an on-period of the first switching element Q1, so that a constant voltage control is performed.

Figure 2A:
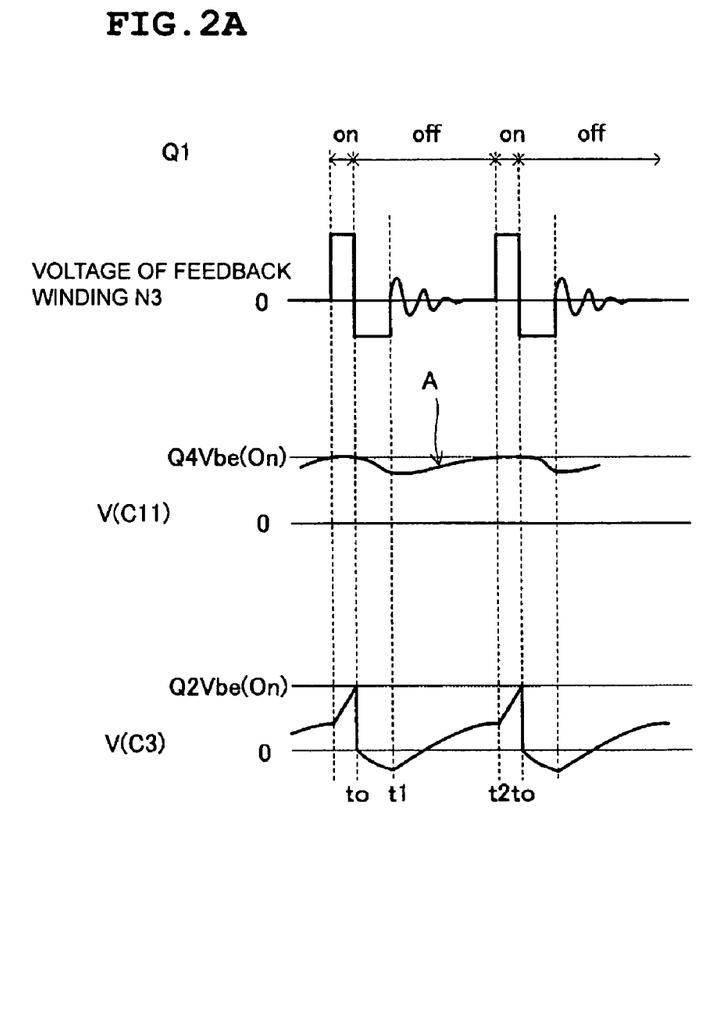
FIGS. 2A and 2B show voltage waveforms of respective components in the switching power supply device of the first preferred embodiment of the present invention.
Figure 2B:
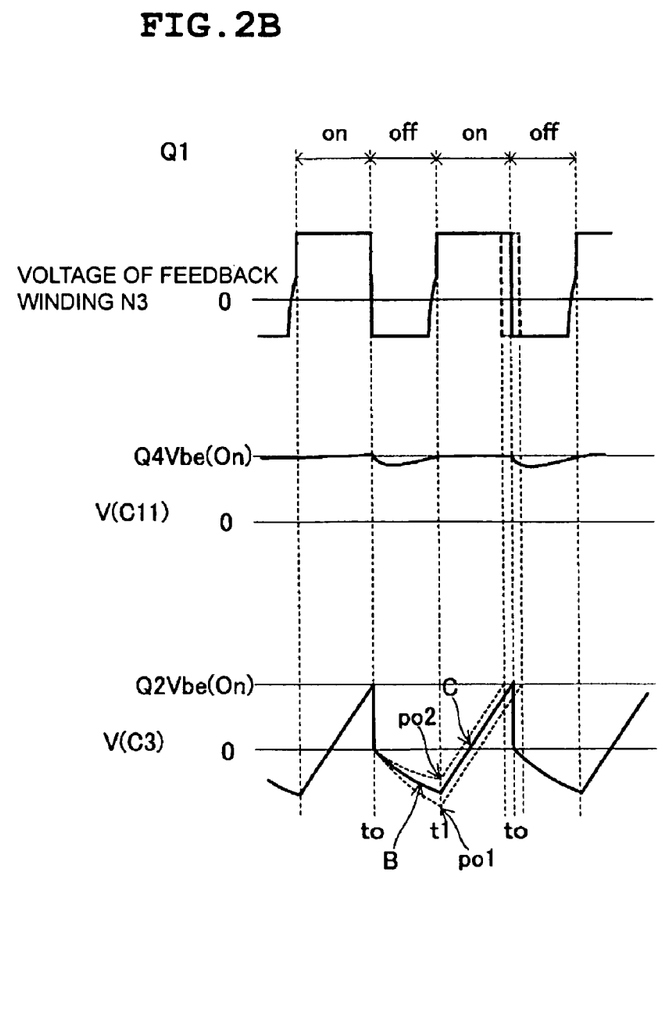

FIGS. 2A and 2B show voltage waveforms of respective components shown in FIG. 1 under a light load and a heavy load. Herein, FIG. 2A shows a light load status and FIG. 2B shows a heavy load status. In the figures, V(C11) indicates the voltage of the capacitor C11, V(C3) indicates the voltage of the capacitor C3, Q4Vbe(On) indicates a base-emitter threshold voltage required by the fourth switching element Q4 to be turned on, and Q2Vbe(On) indicates a base-emitter threshold voltage required by the second switching element Q2 to be turned on.

Under a light load, as shown in FIG. 2A, the second switching element Q2 is turned on when the voltage V(C3) reaches Q2Vbe(On) at the timing of "t0" and the first switching element Q1 is turned off accordingly. The turn-off of the first switching element Q1 causes a reverse voltage (flyback voltage) to be generated in the feedback winding N3 and the collector potential of the second switching element Q2 turns to a negative potential. Accordingly, a current reversely flows between the base and collector of the second switching element Q2, so that the capacitor C3 is discharged quickly.

After that, a reverse voltage generated in the feedback winding N3 causes the capacitor C3 to be negatively charged through a path: C3→R6→N3 during a period from "t0" to "t1". Also, the capacitor C11 is discharged (negatively charged) through a path: C11→base-collector of Q4→R9→C6→N3. Although the capacitor C11 has been charged through a path: C10→R24→R23→C11, the impedance of the phototransistor PT1 is low under a light load and its effect is small.

At the timing of "t1" when the voltage of the feedback winding N3 turns from negative to positive and when the energizing current of the transformer T becomes 0 (zero), the capacitor C11 is charged through a path: C10→R24→R23→C11. At this time, a current also flows through a path: R24→PT1→R16, and thus the charging time constant of the capacitor C11 changes in accordance with the impedance of the phototransistor PT1. In other words, a rising inclination denoted by "A" in the figure of V(C11) from "t1" to "t2" changes depending on the load.

77 For example, since the impedance of the phototransistor PT1 becomes smaller as the load becomes lighter, the charging time constant of the capacitor C11 increases and a degree of the inclination A decreases. Conversely, the impedance of the phototransistor PT1 becomes higher as the load becomes heavier, and thus the charging time constant of the capacitor C11 decreases and a degree of the inclination A increases. Accordingly, the on-timing of the fourth switching element Q4 changes and the on-timing of the third switching element Q3, that is, the on-timing of the first switching element Q1 changes. As a result, the off-period of the first switching element Q1 is controlled and a constant voltage is output. At this time, the capacitor C3 is charged through a path: C10→R24→PT1→D4→C3, so that the voltage V(C3) rises.

When the first switching element Q1 is turned on at time "t2", the capacitor C3 is charged through a path: N3→R6→C3. As can be seen in the figure, the voltage V(C3) rises in the period from "t2" to "t0" more sharply than in the period from "t1" to "t2". When the voltage V(C3) reaches Q2Vbe(On) at time "t0", the second switching element Q2 is turned on and the first switching element Q1 is turned off.

Under heavy load, as shown in FIG. 2B, the second switching element Q2 is turned on when the voltage V(C3) reaches Q2Vbe(On) at the timing of "t0" and the first switching element Q1 is turned off accordingly. The turn-off of the first switching element Q1 causes a reverse voltage (flyback voltage) to be generated in the feedback winding N3 and the collector potential of the second switching element Q2 turns to a negative potential. Accordingly, a current reversely flows between the base and collector of the second switching element Q2, so that the capacitor C3 is discharged quickly.

After that, a reverse voltage generated in the feedback winding N3 causes the capacitor C3 to be negatively charged through a path: C3→R6→N3 during the period from "t0" to "t1". Since a positive charging path C10→R24→PT1→D4→C3 also exists, the negative charging time constant of the capacitor C3 depends on the impedance of the phototransistor PT1. Under heavy load, the impedance of the phototransistor PT1 is relatively high and thus the collector voltage of the phototransistor PT1 is also high. Therefore, the capacitor C11 is hardly discharged and is quickly charged in the period from "t0", to "t1", and the fourth switching element Q4 is already turned on at time "t1". Thus, the third switching element Q3 is also turned on.

As described above, since the fourth switching element Q4 is already in an on-state at the timing "t1", the first switching element Q1 is turned on based on the resonance voltage of the feedback winding N3 thereafter.

Then, the capacitor C3 is positively charged through a path: N3→R6→C3. Then, when the voltage V(C3) reaches Q2Vbe (On) at the timing "to", the second switching element Q2 is turned on and the first switching element Q1 is turned off.

Under heavy load, as shown in FIG. 2B, the on-period of the first switching element Q1 ("t1" to "to") changes in accordance with a change in the inclination denoted by B in the figure of the voltage V(C3) of the capacitor C3 due to the load. For example, since the impedance of the phototransistor PT1 becomes lower as the load becomes lighter, the charging time constant in a positive direction to the capacitor C3 through the first path p1 becomes small, the inclination B becomes gradual, and the voltage V(C3) at the turn-on timing of the first switching element Q1 becomes higher as indicated by "Po2". As a result, the voltage V(C3) reaches Q2Vbe(On) more quickly and thus the on-period of the first switching element Q1 becomes shorter. Conversely, since the impedance of the phototransistor PT1 becomes higher as the load becomes heavier, the charging time constant in a positive direction to the capacitor C3 through the first path p1 becomes large, the inclination B becomes sharp, and the voltage V(C3) at the turn-on timing of the first switching element Q1 becomes lower as indicated by "Po1". As a result, the voltage V(C3) reaches Q2Vbe(On) more slowly and thus the on-period of the first switching element Q1 becomes longer.

In this way, the on-period of the first switching element Q1 is controlled in accordance with the load, so that a constant voltage is output.

Since the negative feedback circuit 7 is provided in the output voltage control circuit 3, a current flowing to the photodiode PD1 of the photocoupler PC1 does not decrease abruptly and the phototransistor PT1 constantly operates in an active region. Therefore, the photodiode PD1 is not turned on/off depending on a voltage variation (output ripple) of the output terminal Po, and the switching frequency is determined by the constant of a CR in the off-period control circuit 5 and the on-period control circuit 6.

As described above, operation modes under light load (standby status) and under heavy load (rated status) are not switched by an increase in the output voltage, and thus no difference arises between the output voltage in a standby status and the output voltage in a rated status. Furthermore, the use of the single-circuit feedback system can prevent an inconvenience of a variation in the output voltage, which is caused by a change in gain due to switching between two circuits of feedback systems for the on-period control circuit 6 and the off-period control circuit 5.

Second Preferred Embodiment

Next, a switching power supply device according to a second preferred embodiment is described with reference to FIGS. 3 and 4.

Figure 3:
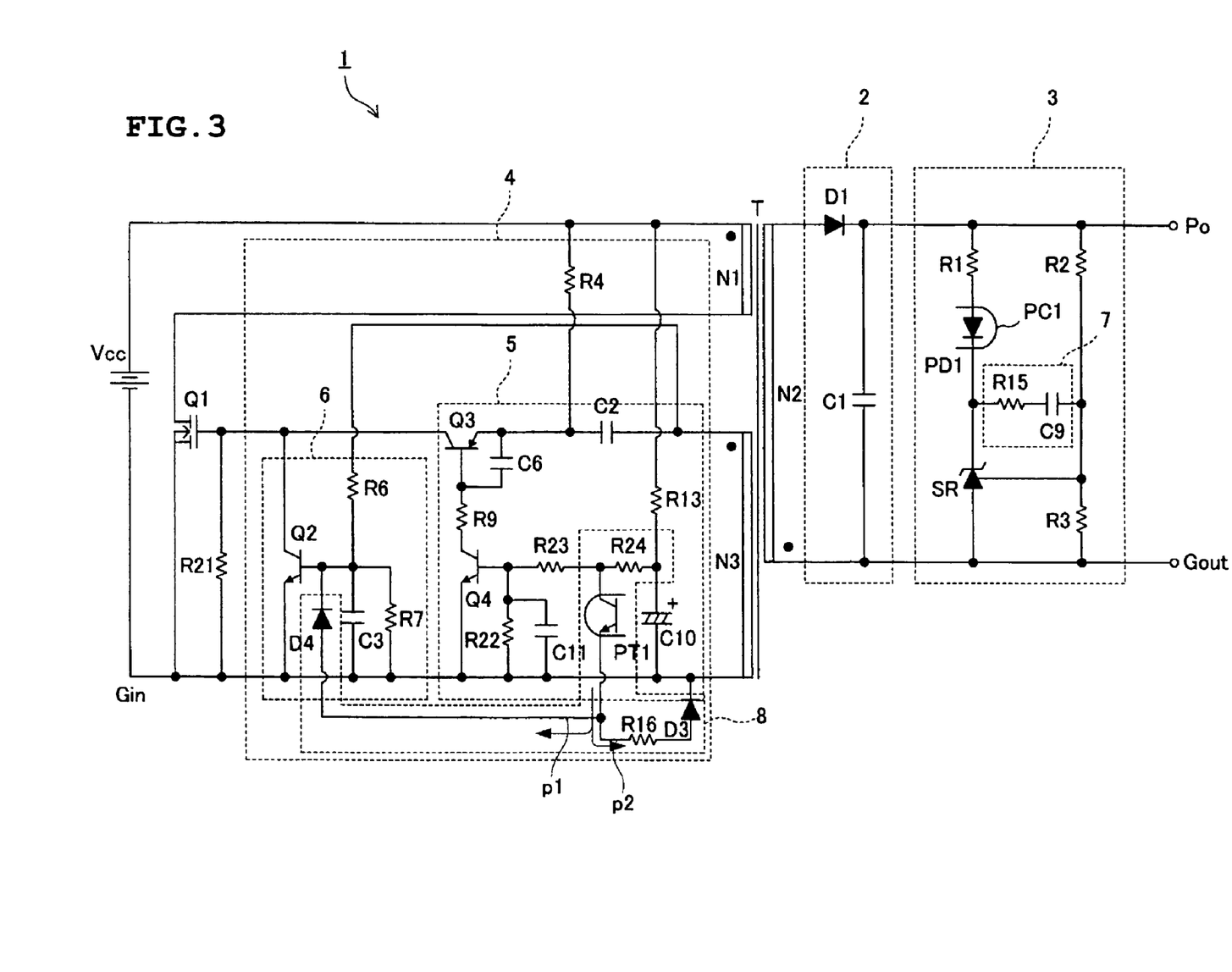
FIG. 3 is a circuit diagram of a switching power supply device according to a second preferred embodiment of the present invention.

FIG. 3 is a circuit diagram of the switching power supply device. Unlike the switching power supply device shown in FIG. 1 according to the first preferred embodiment, a diode D3 connects in series to the resistor R16. The rest of the configuration is preferably substantially the same as that shown in FIG. 1.

In the first preferred embodiment, the capacitor C3 is positively charged through a path: C10→R24→PT1→D4→C3 in an off-period of the first switching element Q1. Under no load, however, the impedance of the phototransistor PT1 becomes a minimum and the potential of the capacitor C3 sharply increases, and thus the second switching element Q2 can be turned on before the third switching element Q3 is turned on according to a circuit constant. In that case, even after the third switching element Q3 is turned on, no voltage is applied to the gate of the first switching element Q1 and the first switching element Q1 cannot be turned on. This causes an intermittent oscillation status. In the intermittent oscillation status, an oscillation period is long, so that the following capability at a sudden change in load degrades.

In the second preferred embodiment, the diode D3 connects in series to the resistor R16 as described below. With this configuration, the voltage of the capacitor C3 can be held to a constant voltage in an off-period of the first switching element Q1. Further, by setting this voltage low so that the second switching element Q2 cannot be turned on, turn-on of the second switching element Q2 in an off-period of the first switching element Q1 can be prevented, and thus intermittent oscillation can be prevented.

An operation of the switching power supply device shown in FIG. 3 (the operation different from that of the switching power supply device shown in FIG. 1) is as follows.

<2.1> Under light load

Under light load, an on-period of the first switching element Q1 is fixed and the output voltage is kept constant by controlling an off-period of the first switching element Q1.

<2.1.1> Off-period of the first switching element Q1

(Operation of the main circuit)

This is the same as in the first preferred embodiment. That is, under light load, turn-on of the third switching element Q3 is a necessary condition to end an off-period of the first switching element Q1. The first switching element Q1 shifts to an on-period upon turn-on of the third switching element Q3.

(Operation of the control circuit)

A current flowing through the phototransistor PT1 is divided into a current flowing through a path p2 including the resistor R16 and the diode D3 and a current flowing through a path p1 for charging the capacitor C3 through the diode D4. The capacitor C3 is charged by the current flowing through the path p1 including the diode D4, but the voltage V(C3) thereof is held to a constant voltage by the diodes D3 and D4 and the resistor R16. Herein, assuming that a forward dropping voltage of the diode D3 is VF(D3), that a dropping voltage of the resistor R16 is VR16, and that a forward dropping voltage of the diode D4 is VF(D4), the emitter terminal voltage of the phototransistor PT1 is held to VF(D3)+VR16, and thus a held voltage V(C3)CL of the capacitor C3 can be represented by the following expression:

$$V(C3)CL = VF(D3) + VR16 - VF(D4).$$

<2.1.2> On-period of the first switching element Q1

(Operation of the main circuit)

As in the first preferred embodiment, a current flows through a path: Vcc→N1→Q1→Gin and energy is accumulated in the transformer T. When the second switching element Q2 is turned on, the first switching element Q1 is turned off and shifts to an off-period.

(Operation of the control circuit)

Under light load, an on-period is fixed.

That is, at the time when the first switching element Q1 is turned on, a base voltage of the second switching element Q2 (the voltage V(C3) of the capacitor C3) is kept at the above-described held voltage:

V(C3)=VF(D3)+VR16−VF(D4), and then the capacitor C3 is charged by a voltage generated in the feedback winding N3. The time constant at this time is determined by the circuit defined by the resistors R6 and R7 and the capacitor C3 regardless of the impedance of the phototransistor PT1 and so on. As described above, since the initial value of the charge in the capacitor C3 and the time constant of the time constant circuit defined by the resistors R6 and R7 and the capacitor C3 are constant, the on-period is fixed. When the voltage of the capacitor C3 reaches the on-voltage Vbe(On) of the second switching element Q2, the second switching element Q2 is turned on and the first switching element Q1 shifts to an off-period.

<2.2> Under heavy load

Under heavy load, the same operation as that in the first preferred embodiment is performed.

Figure 4A:
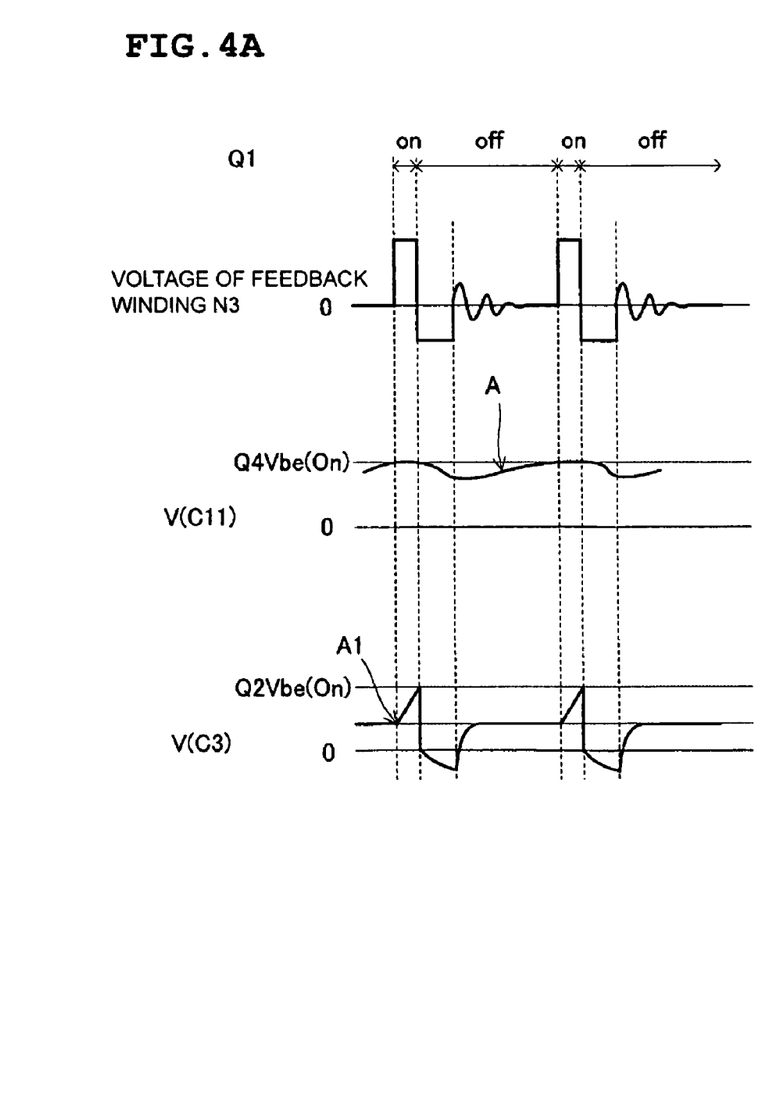
FIGS. 4A and 4B show voltage waveforms of respective components in the switching power supply device of the second preferred embodiment of the present invention.
Figure 4B:
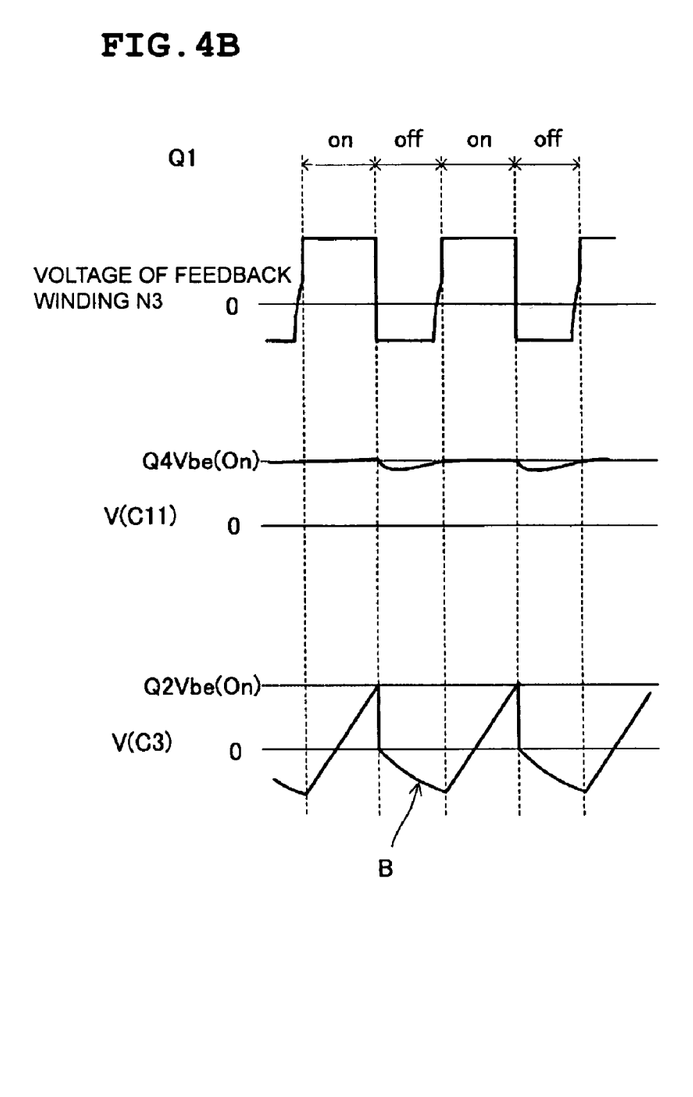

FIGS. 4A and 4B show voltage waveforms of respective components shown in FIG. 3 under light load and under heavy load. FIG. 4A shows a light load status and FIG. 4B shows a heavy load status. Under light load, as shown in FIG. 4A, the voltage V(C3) of the capacitor C3 is held to a constant voltage by the diodes D3 and D4 and the resistor R16 during an off-period of the first switching element Q1. Therefore, the initial value of the charge in the capacitor C3 is constant as indicated by a point A1. Further, since the time constant of the time constant circuit defined by the resistors R6 and R7 and the capacitor C3 is constant, an on-period of the first switching element Q1 is fixed.

As described above, by holding the voltage of the capacitor C3 to a constant value, the voltage V(C3) does not reach Q2Vbe(On) during an off-period of the first switching element Q1 even under no load and the second switching element Q2 is not turned on. Accordingly, a minimum on-period of the first switching element Q1 is set and intermittent oscillation can be prevented.

Third Preferred Embodiment

Next, a switching power supply device according to a third preferred embodiment is described with reference to FIG. 5.

Figure 5:
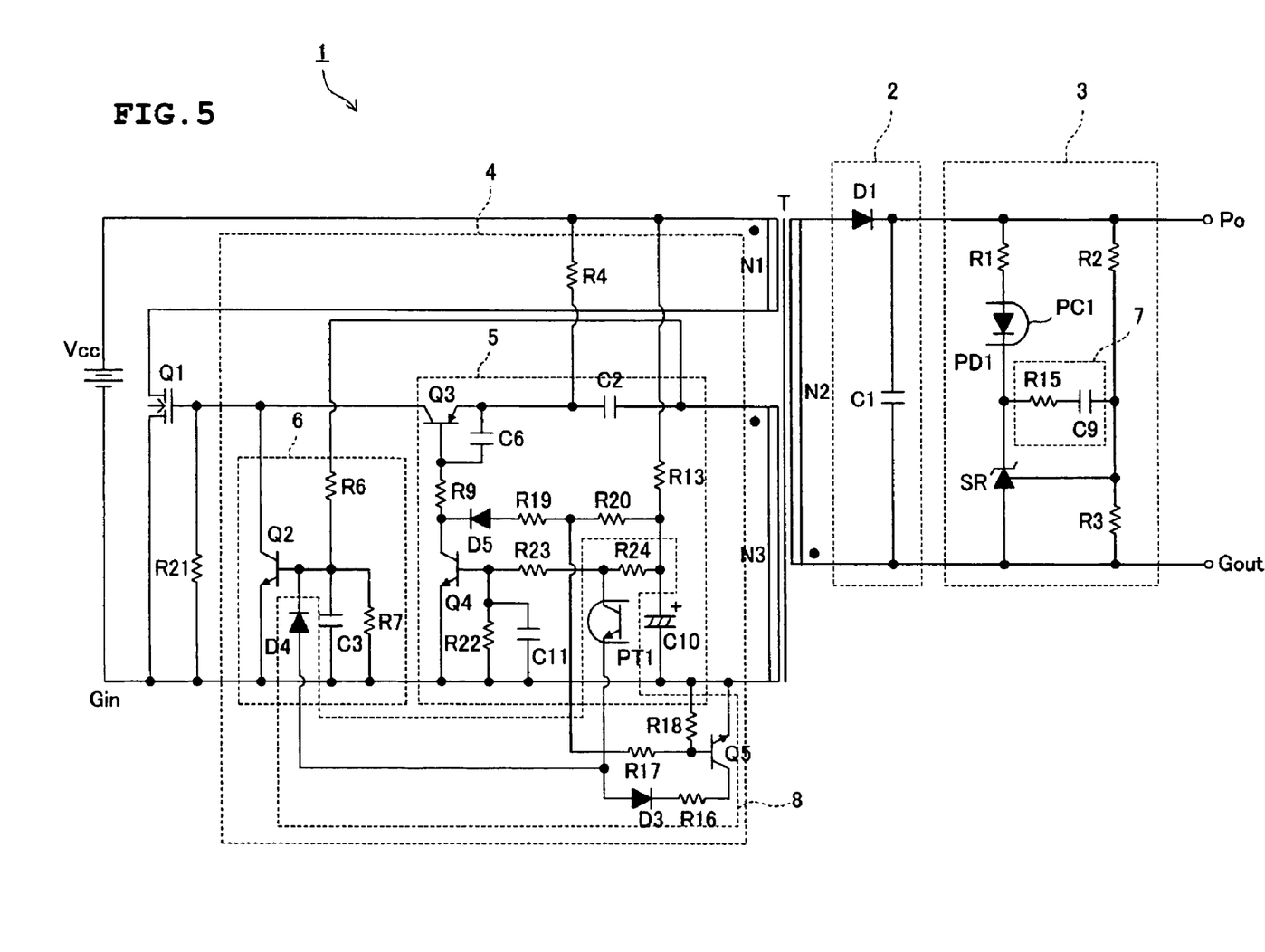
FIG. 5 is a circuit diagram of a switching power supply device according to a third preferred embodiment of the present invention.

FIG. 5 is a circuit diagram of the switching power supply device. This switching power supply device is different from that shown in FIG. 3 in that a switching element Q5, resistors R17, R18, R19, and R20, and a diode D5 are added. These added components operate in the following manner.

The diode D5 and the resistors R17 to R20 detect on/off of the fourth switching element Q4 to control on/off of the switching element Q5. That is, turn-on of the fourth switching element Q4 causes a current to flow through a path: R20→R19→D5→Q4. Accordingly, the potential at a node between the resistors R20 and R19 decreases and a base potential of the switching element Q5 decreases, so that the switching element Q5 is turned off. On the other hand, turn-off of the fourth switching element Q4 causes the base potential of the switching element Q5 to rise, which turns on the switching element Q5.

During an off-period of the first switching element Q1 (during an off-period of the fourth switching element Q4), the diodes D3 and D4, the resistor R16, and the switching element Q5 feed a current of the phototransistor PT1 to the input power supply side ground Gin through the diode D3 and the resistor R16 by turn-on of the switching element Q5. On the other hand, during an on-period of the first switching element Q1 (during an on-period of the fourth switching element Q4), the capacitor C3 is charged with the current of the phototransistor PT1 through the diode D4 by turn-off of the switching element Q5.

The operation of the other circuits is preferably substantially the same as in the first and second preferred embodiments.

As described above, the amount of electric charge to be applied to the capacitor C3 during an on-period of the first switching element Q1 can be changed without depending on the path of the resistor R16, so that the degree of freedom can be increased.

For example, assume that the resistor R16 in the circuits shown in FIGS. 1 and 3 according to the first and second preferred embodiments is a low-resistance resistor. In this case, most of the current flowing through the phototransistor PT1 flows through a path including the diode D3 and the resistor R16, so that the voltage of the capacitor C3 gradually rises during an on-period of the first switching element Q1. In this case, intermittent oscillation may occur due to a too long on-period under light load or no load. At the worst, the output voltage rises. This problem is well managed in the second preferred embodiment compared to in the first preferred embodiment, but the problem occurs in some instances. On the other hand, in the third preferred embodiment, the path including the diode D3 and the resistor R16 is interrupted by the switching element Q5 in an on-period of the first switching element Q1, and thus the above-described problem does not occur.

Fourth Preferred Embodiment

Next, a switching power supply device according to a fourth preferred embodiment is described with reference to FIG. 6.

Figure 6:
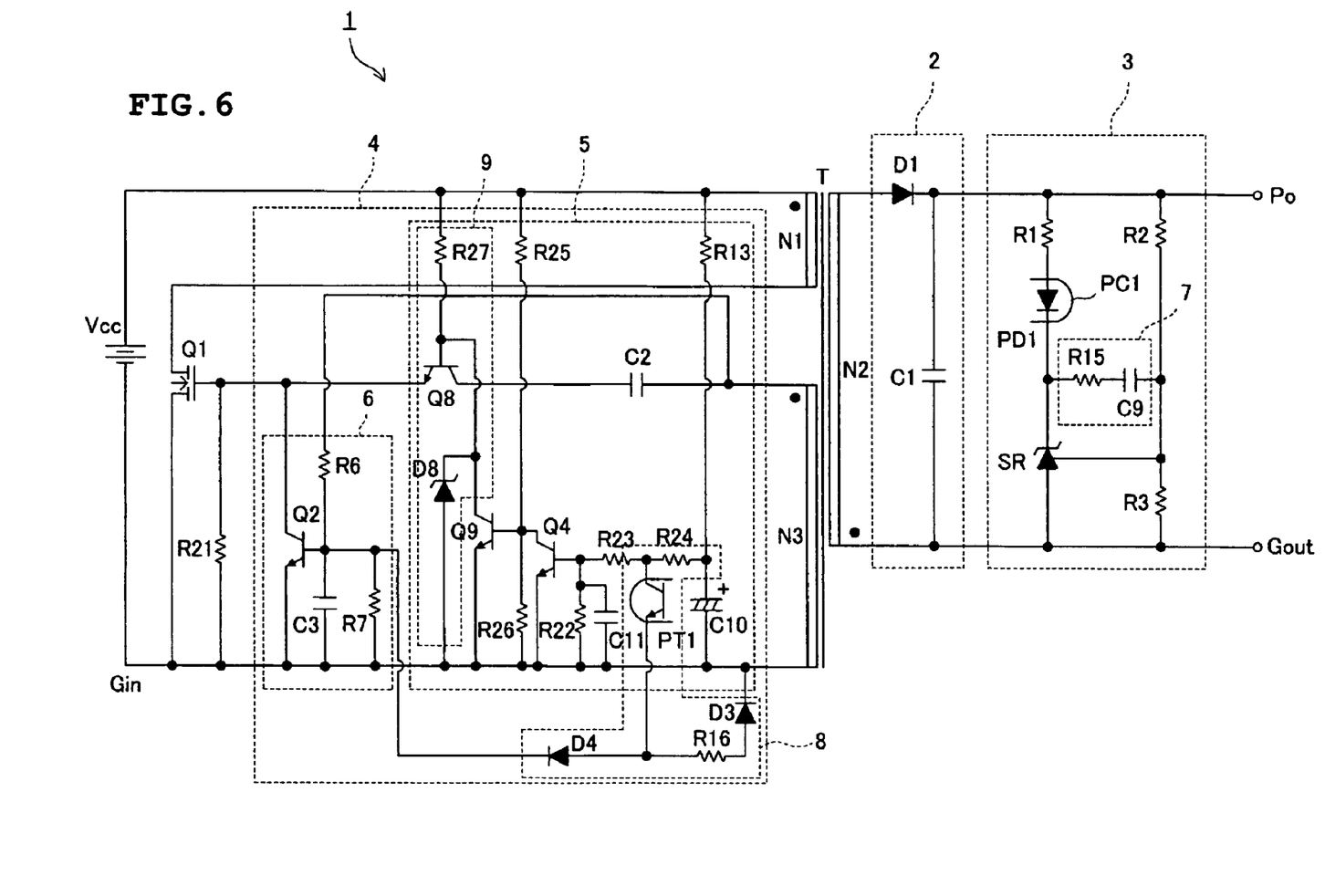
FIG. 6 is a circuit diagram of a switching power supply device according to a fourth preferred embodiment of the present invention.

FIG. 6 is a circuit diagram of the switching power supply device. This switching power supply device is different from that shown in FIG. 3 according to the second preferred embodiment in that the circuit defined by the switching element Q3, the capacitor C6, and the resistor R9 shown in FIG. 3 is replaced by a voltage regulator circuit defined by resistors R25, R26, and R27, switching elements Q8 and Q9, and a Zener diode D8.

Herein, the switching element Q8 and the Zener diode D8 define the voltage regulator circuit, whereas the switching element Q9 and the resistors R25 and R26 define an inverting circuit for inverting a voltage signal.

This switching power supply device has the following advantage in addition to that of the switching power supply device shown in FIG. 3 according to the second preferred embodiment.

The Zener diode D8 defines a constant voltage regulator (limit circuit) together with the switching element Q8 and limits the gate voltage (control voltage) of the first switching element Q1 so that the gate voltage does not exceed a predetermined range. That is, the gate voltage of the first switching element Q1 is controlled not to exceed a maximum:

$Vgs(Q1)=Vz(D8)-Vbe(Q8)$.

Herein, Vgs(Q1) is a gate-source voltage of the first switching element Q1, Vz(D8) is a Zener voltage of the Zener diode D8, and Vbe(Q8) is a forward base-emitter voltage of the switching element Q8.

With this configuration, the control voltage of the first switching element Q1 can be prevented from exceeding the predetermined voltage over a wide input voltage range, such as a World Wide input, and thus the first switching element Q1 can be protected from breaking down.

Fifth Preferred Embodiment

Figure 7:
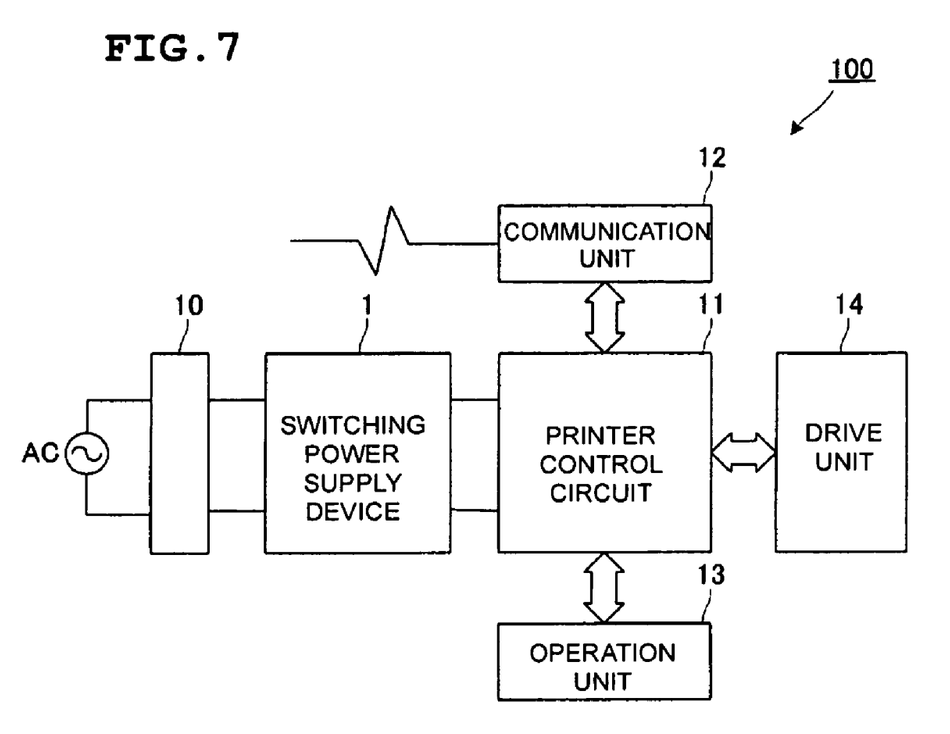
FIG. 7 is a block diagram showing a configuration of a printer according to a fifth preferred embodiment of the present invention.

Next, an electronic apparatus according to a fifth preferred embodiment is described with reference to FIG. 7. FIG. 7 is a block diagram 100 showing a configuration of a printer. A rectifier circuit 10 receives a power supply voltage of a commercial AC power supply AC, rectifies the power supply voltage, and outputs the power supply voltage to a switching power supply device 1. This switching power supply device 1 corresponds to the switching power supply device according to any of the first to fourth preferred embodiments. A printer control circuit 11 operates by using a DC power supply voltage output from the switching power supply device 1 as power. The printer control circuit 11 transmits/receives data to/from a host apparatus through a communication unit 12 and a communication line, reads an operation of an operation unit 13, and drives a drive unit 14.

The drive unit 14 consumes power during a printing operation but hardly consumes power during a standby status when no printing operation is performed. Since the switching power supply device 1 of the preferred embodiments of the present invention is used, power loss in a standby status can be reduced and the efficiency can be increased.

The electronic apparatus of the preferred embodiments of the present invention is not limited to a printer, but can also be applied to various electronic apparatuses requiring a DC power supply of a stable voltage, such as a notebook personal computer and a portable information apparatus.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A switching power supply device comprising:
   a transformer including a primary winding, a secondary winding, and a feedback winding;
   a first switching element connected in series to the primary winding;
   a control circuit provided between a control terminal of the first switching element and the feedback winding;
   a rectifier circuit connected to the secondary winding;
   an output voltage control circuit arranged to detect an output voltage output from the rectifier circuit and feed back the output voltage to the control circuit through a single system; and
   an impedance circuit; wherein
   the control circuit includes an on-period control circuit arranged to turn off the first switching element in an on-state based on a feedback signal transmitted from the output voltage control circuit through the single system under non-light load, and an off-period control circuit arranged to control an off-period of the first switching element by delaying turn-on of the first switching element based on the feedback signal under light load;
   the impedance circuit is arranged to connect the off-period control circuit to the on-period control circuit, the impedance of the impedance circuit changing based on the feedback signal, wherein control of the off-period control circuit under light load and control of the on-period control circuit under non-light load are sequentially performed in accordance with a change in the impedance of the impedance circuit;
   the on-period control circuit includes a second switching element provided between the control terminal of the first switching element and ground and a time constant circuit including a capacitor arranged to apply a control voltage to the second switching element;
   the off-period control circuit includes a third switching element provided between the control terminal of the first switching element and the feedback winding and a fourth switching element provided between a control terminal of the third switching element and ground; and
   the impedance circuit includes a first path arranged to feed a current generated by the feedback signal to the capacitor and a second path serving as a bypass to feed the current to ground.

2. The switching power supply device according to claim 1, wherein a minimum on-period is set in the on-period controlled by the on-period control circuit.

3. The switching power supply device according to claim 2, wherein the impedance circuit is provided with a clamp circuit arranged to control a voltage of the capacitor in the on-period control circuit for determining the control voltage of the second switching element at a predetermined value when the first switching element is in an off-state.

4. The switching power supply device according to claim 1, wherein the second path is a bypass circuit arranged to feed the current generated by the feedback signal only when the first switching element is in an off-state.

5. The switching power supply device according to claim 1, wherein the off-period control circuit includes a limit circuit arranged to set an upper limit of a voltage applied to the control terminal of the first switching element.

6. An electronic apparatus comprising a power supply circuit unit including the switching power supply device according to claim 1.

7. The switching power supply device according to claim 1, further comprising a diode in the second path serving as a bypass to feed the current to ground.

8. The switching power supply device according to claim 4, wherein the bypass circuit comprises a switching element having a control circuit connected to ground via a resistor.

* * * * *